United States Patent
Kaushik et al.

(10) Patent No.: US 9,686,208 B2
(45) Date of Patent: *Jun. 20, 2017

(54) STATELESS SERVICES IN CONTENT MANAGEMENT CLIENTS

(71) Applicant: Open Text Corporation, Waterloo (CA)

(72) Inventors: Shreyas Satyanand Kaushik, Bangalore (IN); Siddaram Siddanna Bali, Rawoor (IN); Shu-Shang Sam Wei, Danville, CA (US)

(73) Assignee: Open Text Corporation, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/734,318

(22) Filed: Jun. 9, 2015

(65) Prior Publication Data
US 2015/0271099 A1 Sep. 24, 2015

Related U.S. Application Data

(63) Continuation of application No. 13/630,834, filed on Sep. 28, 2012.

(51) Int. Cl.
G06F 15/16 (2006.01)
H04L 12/927 (2013.01)
H04L 29/06 (2006.01)
H04L 29/08 (2006.01)

(52) U.S. Cl.
CPC ............ *H04L 47/803* (2013.01); *H04L 29/06* (2013.01); *H04L 29/08072* (2013.01); *H04L 67/2809* (2013.01); *H04L 67/2842* (2013.01)

(58) Field of Classification Search
CPC H04L 29/08072; H04L 29/06; H04L 61/2061
USPC ..... 709/203, 220, 224, 228; 370/338; 726/4, 726/11
See application file for complete search history.

(56) References Cited

U.S. PATENT DOCUMENTS

| 8,451,806 B2* | 5/2013 | Kumar ............... H04L 12/4641 370/338 |
| 9,009,327 B2* | 4/2015 | Adhya ............... H04L 12/4641 370/338 |
| 9,083,579 B1* | 7/2015 | Kaushik ................. H04L 29/06 |
| 2006/0294187 A1* | 12/2006 | Hakel ..................... H04L 51/34 709/206 |
| 2008/0043761 A1* | 2/2008 | Kumar ............... H04L 12/4641 370/401 |
| 2012/0023554 A1* | 1/2012 | Murgia ................. H04L 63/102 726/4 |
| 2012/0036244 A1* | 2/2012 | Ramachandra ... H04L 29/12207 709/223 |
| 2012/0177195 A1* | 7/2012 | Elliott ................ H04L 12/6418 379/240 |

(Continued)

*Primary Examiner* — Khanh Dinh
(74) *Attorney, Agent, or Firm* — Sprinkle IP Law Group

(57) ABSTRACT

Techniques to provide stateless services in a content management client are disclosed. A session manager is instantiated to service a request to access a content item. The session manager is used to obtain from a global session pool that is not specific to the session manager a session to service the request. The session is used to service the request. Once the request has been completed the session manager may be terminated, but the global session pool and associated object cache remain.

24 Claims, 8 Drawing Sheets

(56) References Cited

U.S. PATENT DOCUMENTS

2012/0290732 A1* 11/2012 Suganthi ............ H04L 12/4641
709/228

* cited by examiner

STATELESS SERVICES IN CONTENT MANAGEMENT CLIENTS

CROSS REFERENCE TO OTHER APPLICATIONS

This application is a continuation of co-pending U.S. patent application Ser. No. 13/630,834, entitled STATELESS SERVICES IN CONTENT MANAGEMENT CLIENTS filed Sep. 28, 2012 which is incorporated herein by reference for all purposes.

BACKGROUND OF THE INVENTION

Stateless services do not maintain any state on the server. One request is totally independent of the other one. In the case of content management, clients typically operate on objects after getting a session to a repository. The sessions have caches associated with them which store up to date information about the objects. In the stateless case, typically one request gets a session, operates on an object, and releases the session. The next request that wants to operate on the same object typically must retrieve the object again, if as is typical the cache in which the object was stored previously was removed when the session associated with the previous request involving the object was released.

BRIEF DESCRIPTION OF THE DRAWINGS

Various embodiments of the invention are disclosed in the following detailed description and the accompanying drawings.

DETAILED DESCRIPTION

Figure 1:
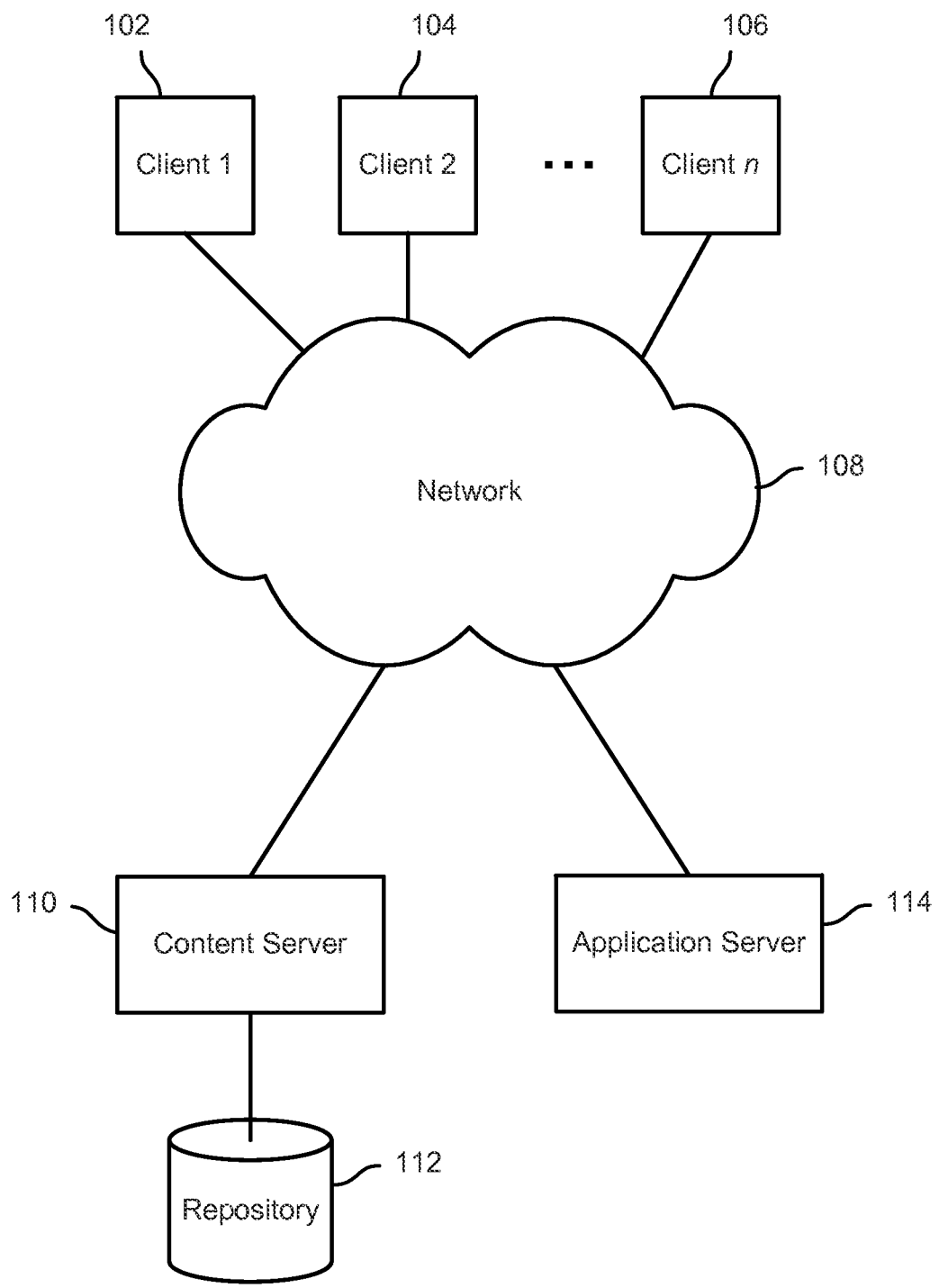
FIG. 1 is a block diagram illustrating an embodiment of a content management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In distributed systems, such as enterprise content management (ECM) systems, documents and other content items may be stored in a remote repository or other content store and accessed via a content server or other access node. Application or other servers and/or client system use sessions connected to the repository to access content. Such sessions typically are managed by session manager entities. Each session manager typically has a session pool associated with it which is called the "Level-1" pool. The sessions that are managed by these session manager entities have object caches, which prevent expensive object fetches from the backend. As long as the sessions are active, which indirectly means "Level-1" pools are active, the expensive fetch operations are avoided. In stateless scenarios, these session manager objects are destroyed after every request and recreated for each new request. Typically, when a session manager is destroyed, the "Level-1" pool is also destroyed, as a cascading effect the sessions and their object caches are also destroyed. This forces the new sessions to perform the expensive object fetches from the backend.

A global session pool, which each of a plurality of session managers use and share, is disclosed. In various embodiments, instead of each session manager having a "Level-1" or other session pool of its own, all of the session manager objects share the global session pool. Sessions released by a session manager go the global pool and are available for other session managers to be picked up. Stateless services which create a new session manager for every request would still have the sessions released by an earlier session manager, and any associated object caches and/or previously retrieved object stored therein, available.

In various embodiments, care is taken to ensure that only the session with the correct credentials are picked up, i.e., a particular session manager is provided only with a session that is appropriate for the request the session manager is working to fulfill, given the credential(s) of the associated user.

In various embodiments, using a global session pool and session managers configured to use the global pool results in sessions that are picked up from the global pool having their object caches remain intact, even after the session manager is no longer extant, with the result that expensive backend fetches of data that may already be in the object cache, if any, is avoided.

FIG. 1 is a block diagram illustrating an embodiment of a content management system. In the example shown, a plurality of end users of content, such as enterprise employees or other users, use client systems such as clients 102, 104, and 106 of FIG. 1 to create, store, access, and otherwise use content, such as documents, files, and/or other stored objects. The client systems 102, 104, and 106 may in various embodiments include one or more of client computer systems, such as desktop, laptop, or other portable computers, and/or so-called "smart" mobile devices such as phones, tablets, or other devices. Client systems such as 102, 104, and 106 connect via one or more networks 108, e.g., the Internet, a mobile telecommunications network, enterprise networks such as a LAN or WAN, etc., with remote servers such as content server 110, which provides access to managed content stored in a repository 112, and one or more application servers such as application server 114.

The application server 114 is configured in various embodiments to run one or more applications in an application framework (e.g., runtime environment) comprising or otherwise associated with a content management system of which content server 110 and repository 112 are elements. For example, applications running on application server 114 in various embodiments may enable users of client systems such as 102, 104, and 106 to create and/or modify content items, and to save them to and/or access them from repository 112 via content server 110. In various embodiments, application server 114 interacts with content server 110 at least in part programmatically to save content items to and/or access content items from repository 112 via content server 110. In various embodiments, application server may establish with content server 110 one or more communications sessions, e.g., for purposes of storing or accessing content items in repository 112. In some embodiments, a stateless communication protocol is used, and a different session is used for each request from application server 114 to content server 110. In some embodiments, the session used to service a request is configured and/or selected to be one that is appropriate for a given request based at least in part on one or more attributes of the request (e.g., user credentials of a user with which the request is associated) and/or one or more attributes of the session (e.g., how long ago the session was last used, etc.).

Figure 2:
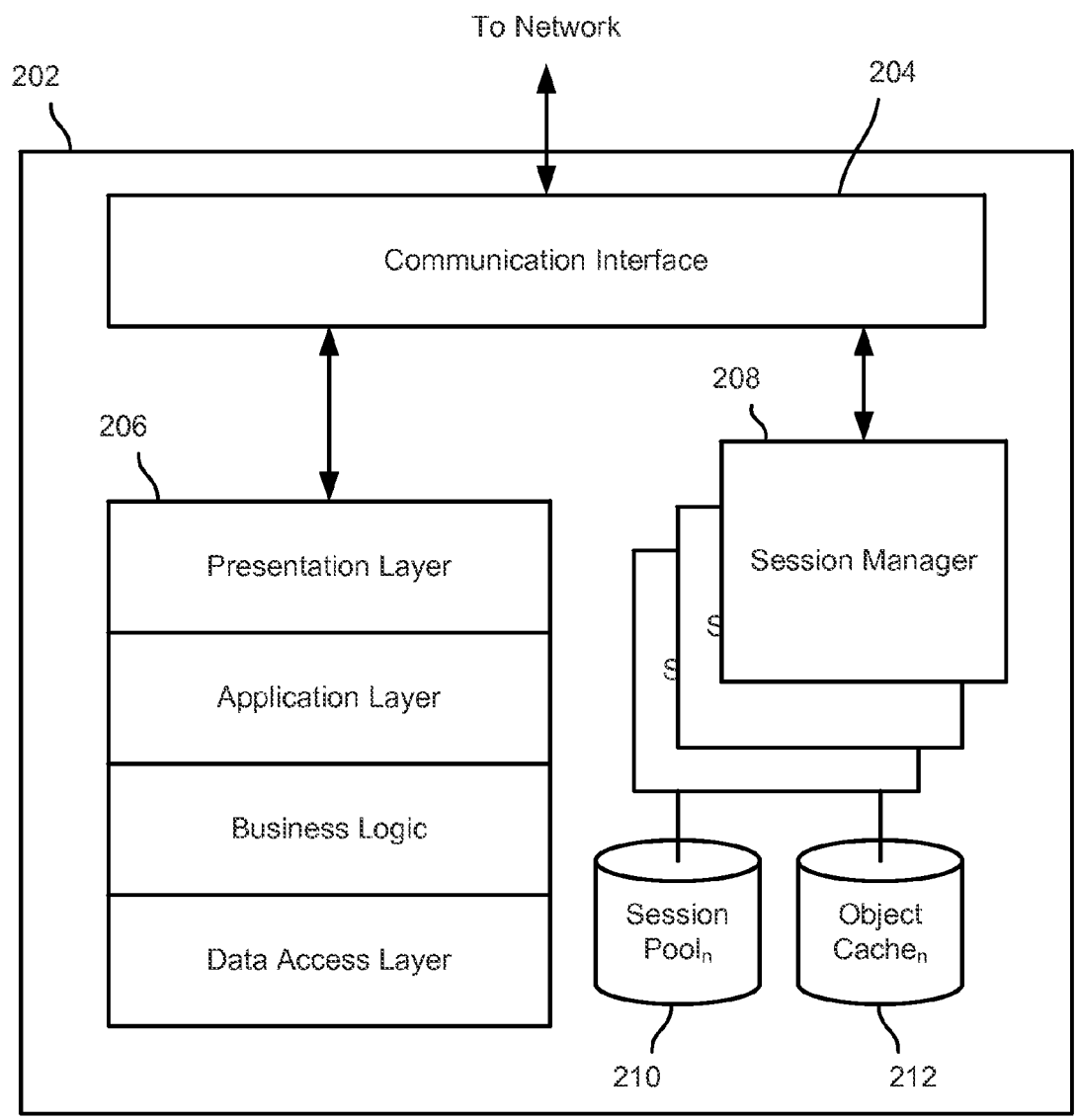
FIG. 2 is a block diagram illustrating an embodiment of a system to access content.

FIG. 2 is a block diagram illustrating an embodiment of a system to access content. In some embodiments, the system of FIG. 2 is included in an application server, such as application server 114 of FIG. 1. In the example shown in FIG. 2, the application server 202 includes a communication interface 204, such as a network interface card (NIC), to provide network connectivity, e.g., to a network such as network 108 of FIG. 1. The communication interface enables elements of a content management stack 206 to communicate via the network with one or more elements comprising a content management system, e.g., content server 110 in the example shown in FIG. 1. The stack 206 includes a presentation layer to display information to users, e.g., via an attached display and/or display pages served to remote clients; an application layer, e.g., comprising one or more applications to create or modify content items; a business logic layer and/or other application framework, which includes in various embodiments content management system foundation classes and/or services available to be invoke by applications in the application layer to interact with the content management system, such as to access, modify, and/or store content items; and a data access layer to interact with the repository to support content operations. In various embodiments, one or more of the layers of stack 206 may reside in a separate physical system, such as a separate server.

In the example shown in FIG. 2, communication with remote elements of the content management system, e.g., content server 110, is performed using a stateless protocol.

A plurality of session managers 208 each has its own session pool 210, comprising currently active or otherwise available communication sessions with the content server, and its own associated object cache 212. For clarity, only one session pool 210 and object cache 212 is shown in FIG. 2, but in the typical prior art approach each session manager would have its own corresponding session pool and object cache. In the typical prior art system, as explained above, this approach may result in objects retrieved previously from the repository and stored in an object cache being deleted upon completion of a request that a particular session manager 208 was instantiated to service. A subsequent request that required access to the same object would require that the object be retrieved again from the repository.

Figure 3:
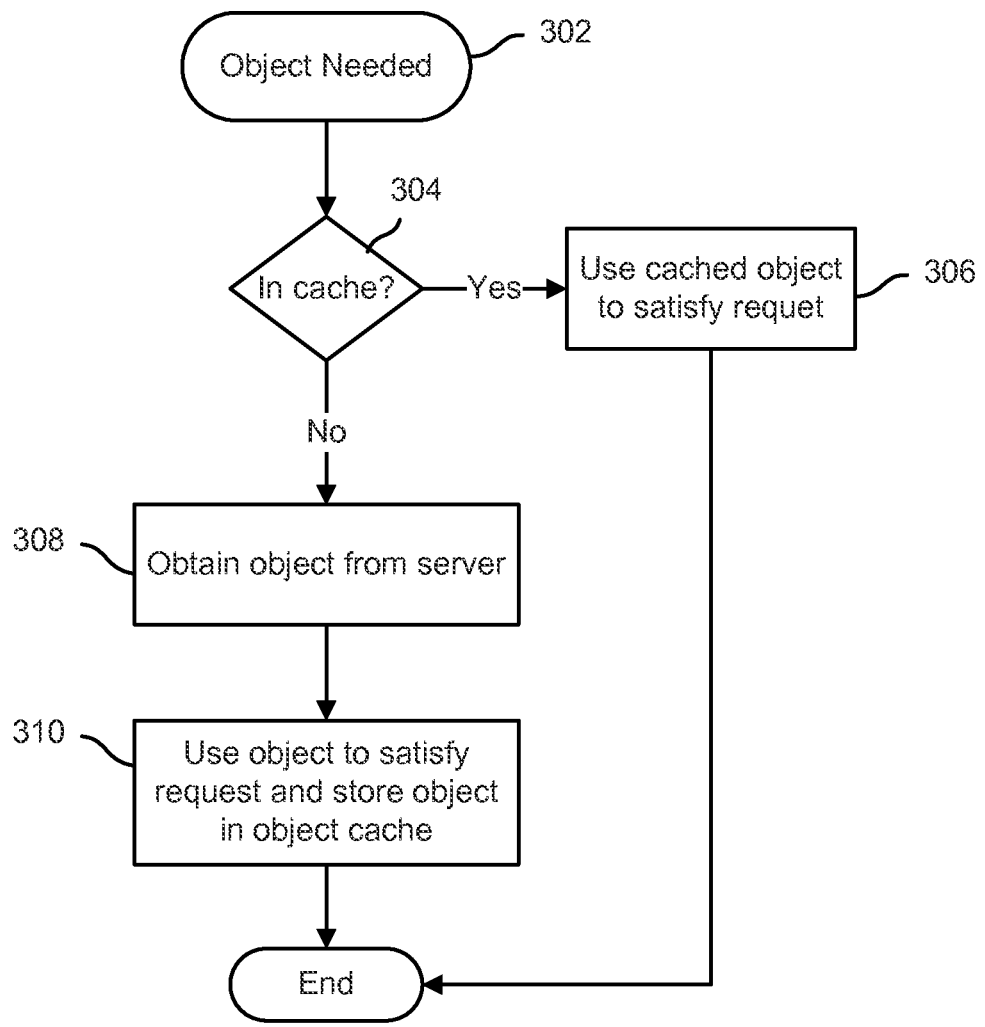
FIG. 3 is a flow chart illustrating an embodiment of a process to provide access to managed content.

FIG. 3 is a flow chart illustrating an embodiment of a process to provide access to managed content. In the example shown, when access to an object stored in a repository is needed (302), the system first checks to see if the object is in an object cache (304). If so, the cached object is used to satisfy the request (306). If not, the object is obtained from the content server (308), and once received the object is used to satisfy the request and is stored in an associated object cached (310).

Figure 4:
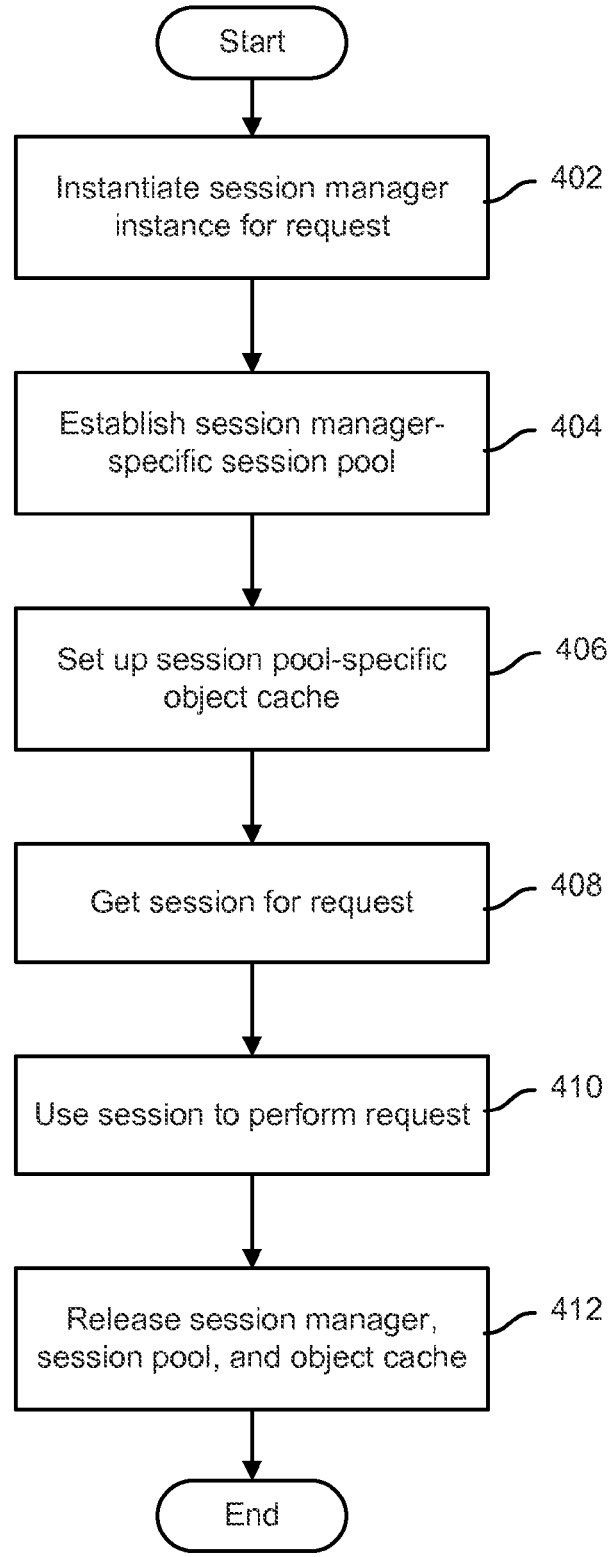
FIG. 4 is a flow chart illustrating an embodiment of a process to provide access to managed content.

FIG. 4 is a flow chart illustrating an embodiment of a process to provide access to managed content. FIG. 4 illustrates the approach used in a typical prior art system. In the example shown, when a request that requires access to a content item stored in a repository is received, a session manager instance is created to service the request (402). A session manager-specific specific session pool is established for the request-specific session manager (404), and a session pool-specific object cache is created (406). A session to be used to service the request is obtained from the session manager, which selects a suitable session from the manager-specific session pool (408). The session is used to perform the request (410). Once the request has been performed, the session manager, session pool, and object cache are deleted (412), resulting in the retrieved object no longer being cached and available locally to be used to service a subsequent request requiring the same object.

Figure 5:
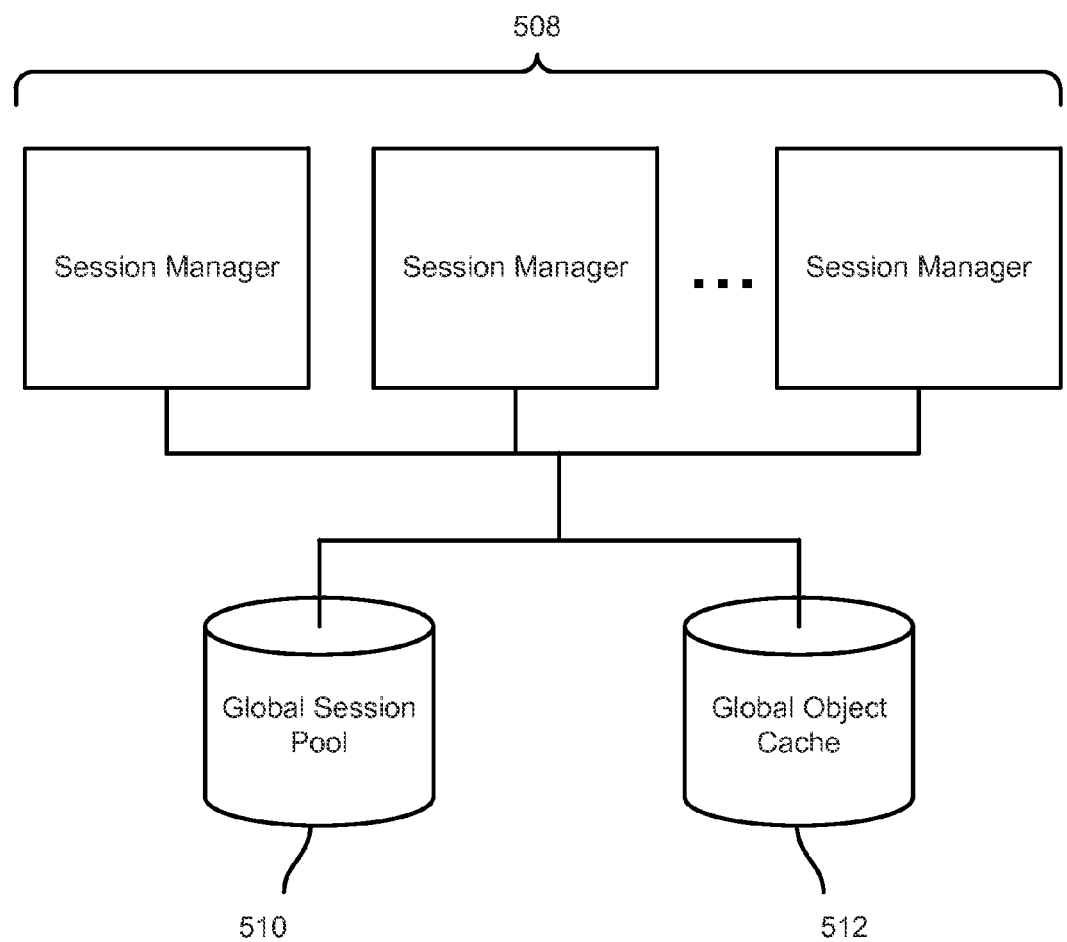
FIG. 5 is a block diagram illustrating an embodiment of a system to provide access to managed content.

FIG. 5 is a block diagram illustrating an embodiment of a system to provide access to managed content. In the example shown, each of a plurality of session managers 508 has access to a shared, global session pool 510 and is associated with a corresponding global object cache 512. Using the approach shown in FIG. 5, each session manager 508 accesses the shared global session pool 510 to obtain a session to be used to fulfill a request. Objects retrieved from the repository via a session are stored in the global object cache 512. In various embodiments, the global session pool 510 and global object cache 512 are global entities that survive the termination of any individual session manager 508. As a result, even if a session manger 508 is terminated an object retrieved in connection with a request the session manager was instantiated and/or used to perform will remain available in the global object cache 512. If a subsequent request requires the same object, for example a later request that is performed by a different session manager 508, the previously retrieved object may remain available in the global object cache 512, and if so the cached object will be used to perform the later request. In various embodiments, the global session pool 510 is configured to service session requests from the session managers 508, and to return to a requesting session manager 508 a session suitable to be used to perform the request the session manager 508 is attempting to perform.

Figure 6:
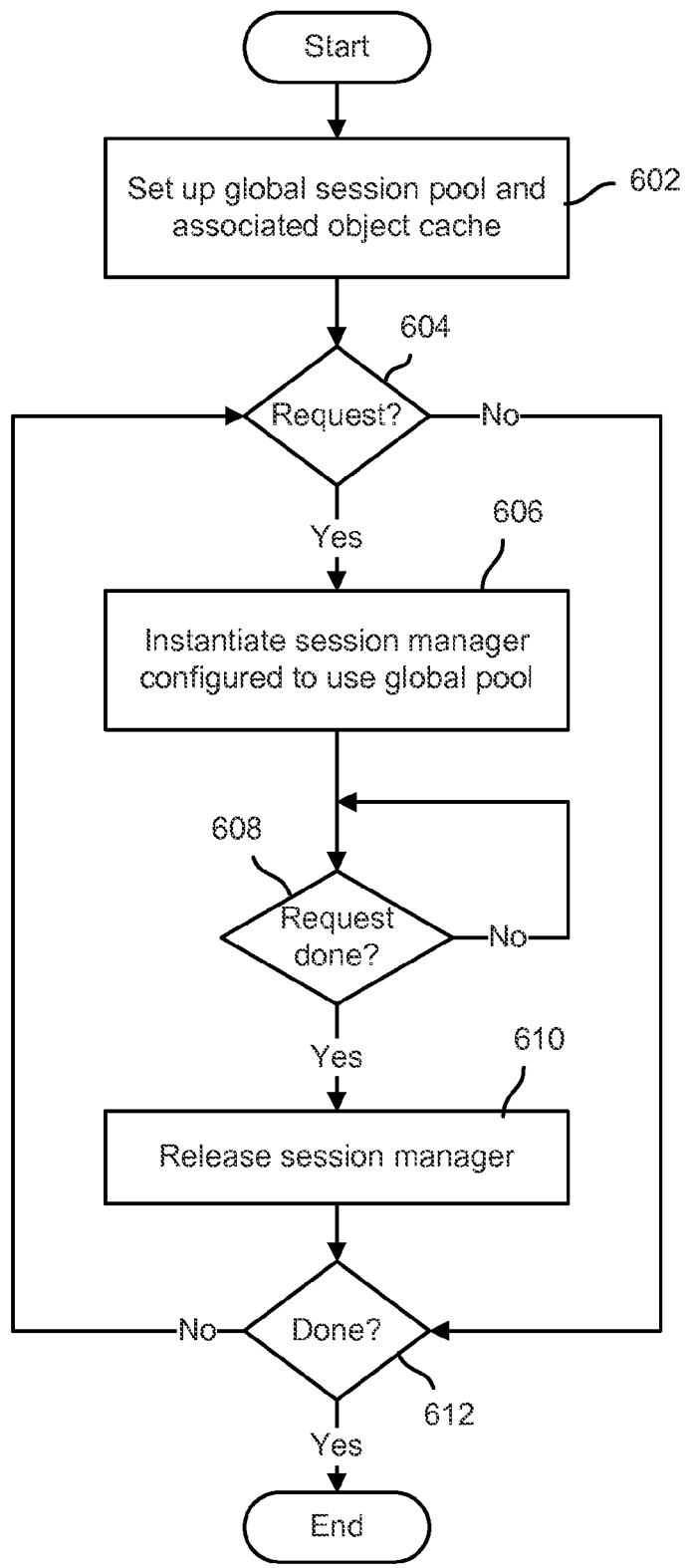
FIG. 6 is a flow chart illustrating an embodiment of a process to provide access to managed content.

FIG. 6 is a flow chart illustrating an embodiment of a process to provide access to managed content. In the example shown, a global session pool and associated global object cache are set up (602). When a request is received (604), a session manager is instantiated and configured to perform the request (606). The session manager is configured to use the global session pool to obtain a session and use the session to perform the request. For example, a session manager class or other definition may be configured such that instances of the session manager know to obtain sessions from the shared global session pool. Once the request has been performed (608), the session manager returns the session to the global session pool and the session manager instance is terminated (610). However, the global session pool and the associated object cache persist, along with any retrieved objects stored therein. The process repeats as subsequent requests are received and performed, until done (612), for example the application server or other content management client is taken offline.

Figure 7:
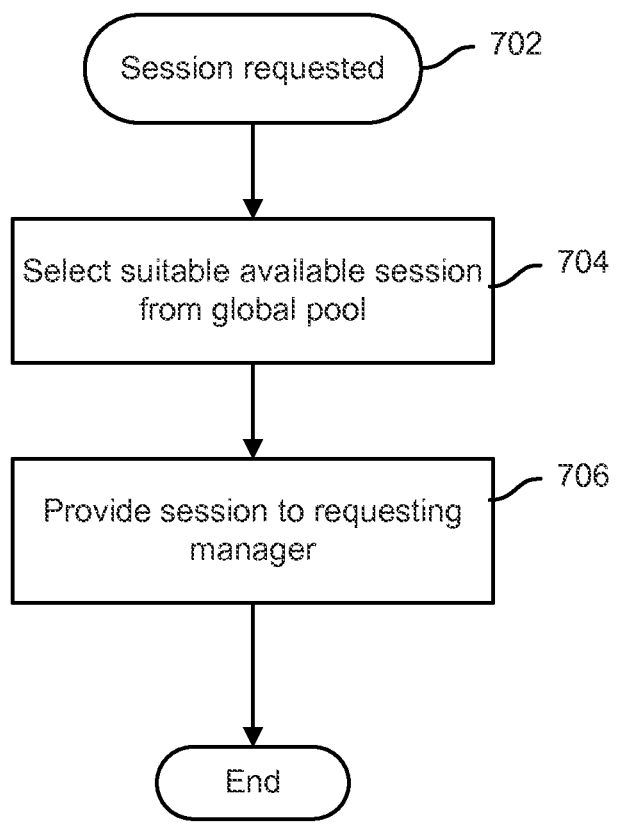
FIG. 7 is a flow chart illustrating an embodiment of a process to provide a session from a global session pool.

FIG. 7 is a flow chart illustrating an embodiment of a process to provide a session from a global session pool. In various embodiments, the process of FIG. 7 is implemented by a global session pool, such as global session pool 510 of FIG. 5. In the example shown, when a session is requested (702), for example by one of a plurality of session managers configured to use the global session pool, a session suitable to perform a request for which the session is being requested is selected from the pool (704) and provided to the requesting manager (706). In various embodiments, the criteria used to select the session to be provided may include one or more of an attribute of the available session (e.g., how recently it was last used) and an attribute associated with the request for which the session is being obtained to perform (e.g., a user or other credential and/or privilege with which the request is associated).

Figure 8:
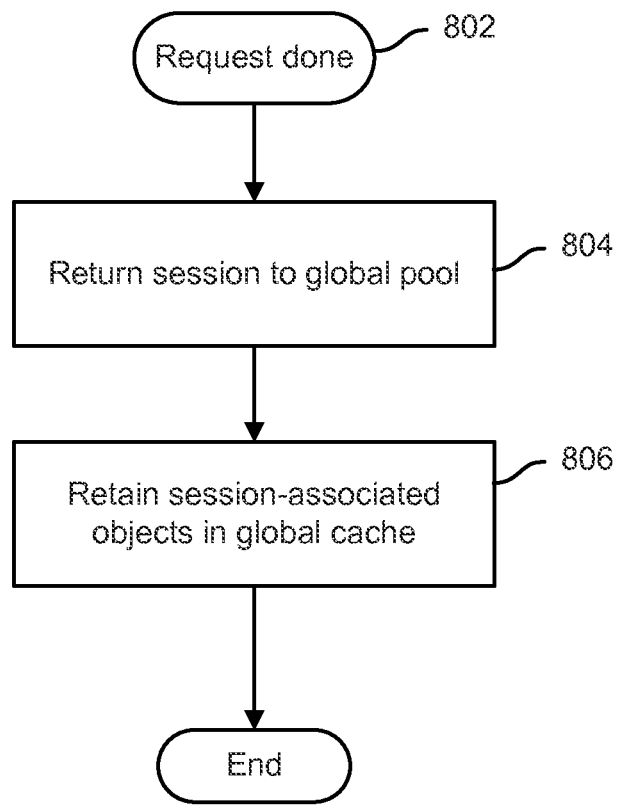
FIG. 8 is a flow chart illustrating an embodiment of a process to return a session to a global session pool.

FIG. 8 is a flow chart illustrating an embodiment of a process to return a session to a global session pool. In the example shown, when a request has been completed (802) the session used to fulfill the request is returned to the global session pool (804). Any objects retrieved in connection with the request are retained in the global object cache (806), which survives completion of the request, even if the session manager instantiated to perform the request is terminated.

Using techniques disclosed herein results in various embodiments in sessions that are picked up from the global pool having their object caches remain intact, even after the session manager is no longer extant, with the result that expensive backend fetches of data that may already be in the object cache, if any, is avoided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to access a content item;
in response to receiving the request to access the content item, instantiating a first session manager to service the request to access the content item, wherein the first session manager is one of a plurality of session managers associated with a global session pool;
retrieving, from the global session pool, a session to service the request to access the content item;
using the session to service the request to access the content item;
storing, in a global object cache, the content item that is retrieved via the session; and
releasing the session to the global session pool in the event that servicing of the request to access the content item is complete, wherein the global session pool survives termination of the session.

2. The method of claim 1, further comprising:
in the event that servicing of the request to access the content item is complete, terminating the first session manager.

3. The method of claim 1, wherein the global session pool is not specific only to the first session manager.

4. The method of claim 1, wherein the session is used to retrieve the content item from a repository.

5. The method of claim 1, wherein the global object cache is associated with the global session pool.

6. The method of claim 5, wherein the global object cache is associated with the global session pool such that objects of the global object cache are available to other session managers of the plurality of session managers associated with the global session pool.

7. The method of claim 1, wherein the global object cache survives termination of the first session manager.

8. The method of claim 1, wherein the global object cache survives termination of the first session manager such that objects retrieved in connection with servicing of the request that are stored in the global object cache are available to other session managers associated with the global session pool.

9. The method of claim 1, further comprising:
receiving a subsequent request to access the content item;
in response to receiving the subsequent request to access the content item, instantiating a second session manager to service the subsequent request to access the content item;
retrieving, from the global session pool, the session that was released to the global session pool by the first session manager; and
using the session to service the subsequent request to access the content item.

10. The method of claim 1, further comprising selecting the session to service the request based at least in part on an attribute of the session.

11. The method of claim 1, further comprising selecting the session to service the request based at least in part on an attribute associated with the request.

12. A content management client system, comprising:
a communication interface; and
a processor coupled to the communication interface and configured to:
receive a request to access a content item;
in response to the request to access the content item being received, instantiate a first session manager to service the request to access the content item, wherein the first session manager is one of a plurality of session managers associated with a global session pool;
retrieve, from the global session pool, a session to service the request to access the content item;
use the session to service the request to access the content item, at least in part by using the session to communicate via the communication interface;
store, in a global object cache, the content item that is retrieved via the session; and
releasing the session to the global session pool in the event that servicing of the request to access the content item is complete, wherein the global session pool survives termination of the session.

13. The system of claim 12, wherein the processor is further configured to:
in the event that servicing of the request to access the content item is complete, terminating the first session manager.

14. The system of claim 12, wherein the global session pool is not specific only to the first session manager.

15. The system of claim 12, wherein the global object cache is associated with the global session pool.

16. The system of claim 15, wherein the global object cache is associated with the global session pool such that objects of the global object cache are available to other session managers of the plurality of session managers associated with the global session pool.

17. The system of claim 12, wherein the global object cache survives termination of the first session manager.

18. The system of claim 17, wherein the global object cache survives termination of the first session manager such that objects retrieved in connection with servicing of the request that are stored in the global object cache are available to other session managers associated with the global session pool.

19. The system of claim 12, wherein the processor is further configured to:
receive a subsequent request to access the content item;
in response to receiving the subsequent request to access the content item, instantiate a second session manager to service the subsequent request to access the content item;
retrieve, from the global session pool, the session that was released to the global session pool by the first session manager; and
use the session to service the subsequent request to access the content item.

20. The system of claim 12, wherein the processor is further configured to select the session to service the request based at least in part on an attribute of the session.

21. The system of claim 12, wherein the processor is further configured to select the session to service the request based at least in part on an attribute associated with the request.

22. The system of claim 12, wherein the processor is further configured to use the session to retrieve the content item from a repository.

23. A computer program product to provide access to content, the computer program product being embodied in a non-transitory computer readable storage medium and comprising computer instructions for:
receiving a request to access a content item;
in response to receiving the request to access the content item, instantiating a first session manager to service the request to access the content item, wherein the first session manager is one of a plurality of session managers associated with a global session pool;
retrieving, from the global session pool, a session to service the request to access the content item;
using the session to service the request to access the content item;
storing, in a global object cache, the content item that is retrieved via the session; and
releasing the session to the global session pool in the event that servicing of the request to access the content item is complete, wherein the global session pool survives termination of the session.

24. The computer program product of claim 23, further comprising computer instructions for using the session to retrieve the content item from a repository.

* * * * *